United States Patent Office 2,933,347
Patented Apr. 19, 1960

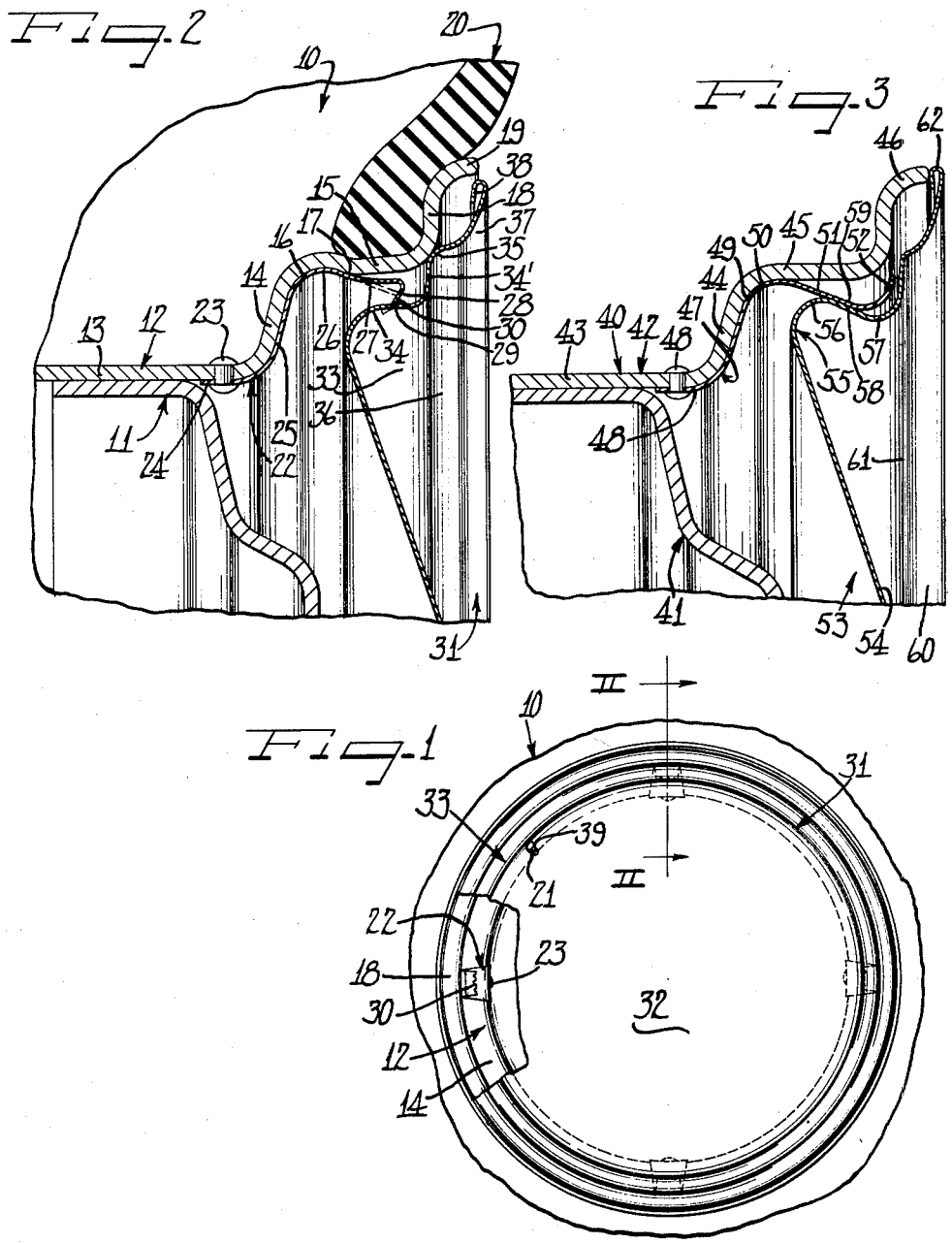

2,933,347

WHEEL COVER

George Albert Lyon, Detroit, Mich.

Application July 2, 1956, Serial No. 595,232

4 Claims. (Cl. 301—37)

This invention relates generally to a new and improved wheel structure and more particularly to the manner in which an ornamental wheel cover member is retained in protective overlying disposition upon a vehicle wheel.

More specifically, the present invention concerns itself with a new and improved spring clip and the manner in which it is adapted to cooperate with a multi-flange drop center type tire rim and also with a wheel cover member to maintain the cover member in snap-on, pry-off engagement upon the vehicle wheel.

Accordingly, an object of this invention is to provide new and improved means for maintaining a wheel cover member in assembly upon a vehicle wheel.

Still another object of this invention is to provide a new and improved spring clip construction which is adapted to cooperate with a vehicle wheel in a new and improved manner.

Yet another object of this invention is to provide a new and improved spring clip construction which is adapted to cooperate with a wheel cover in a new and improved manner to maintain the cover in assembly upon the vehicle wheel.

A still further object of this invention is to provide a wheel structure including spring clips and a cover member which lend themselves to economical manufacture on a large production basis and which are adapted to efficiently and effectively coact with one another.

According to the general features of this invention there is provided in a wheel structure including a wheel having junctioned tire rim and body parts and with the tire rim including an axially extending intermediate flange, circumferentially spaced spring clips on the wheel including a generally axially outwardly extending leg portion and having a generally radially facing gripping edge surface underlying the intermediate rim flange, a wheel cover member adapted for overlying protective retained disposition on the wheel and having an annular cover portion defining a radially facing shoulder underlying the intermediate rim flange, the clips and clip edge surfaces being arranged in a common circle of a slightly reduced diameter than the annular cover portion such that as the wheel cover member is pressed against the wheel the leg portions are caused to resiliently deflect and with the edge surfaces in biting, gripping snap-on, pry-off engagement with the shoulder, the tire rim having radial and axial flanges defining an outer annular rim margin, the cover member having a reinforced cover margin disposed radially outwardly of the radially facing shoulder which cover margin is bounded at a radially inner side by an annular pry-off rib and at its radially outer side by an annular terminal edge which overlies the rim margin, the cover margin having an arched portion which is arched radially outwardly between said annular pry-off rib and the annular terminal edge, said cover margin being bottomed against the rim margin to minimize axial slippage between the engaged surfaces of the clips and the cover member and with the intermediate portion spaced axially from the rim margin and defining a pocket.

Other objects and features of the present invention will more fully become apparent in view of the following detailed description taken in conjunction with the accompanying sheet of drawings illustrating therein several embodiments and in which:

Figure 1 is a side elevation of my wheel structure;

Figure 2 is an enlarged fragmentary cross sectional view taken substantially on the line II—II of Figure 1 looking in the direction indicated by the arrows; and Figure 3 is an enlarged fragmentary cross sectional view similar to Figure 2 only illustrating a modified form of my invention.

As shown on the drawings:

The reference numeral 10 indicates generally my wheel structure which has rim and body parts 11 and 12 respectively. The body part 11 may be attached to a vehicle wheel by inserting lugs on an axle of the vehicle wheel through openings in the body part and thereafter threading nuts onto the lugs to clamp the body part to the axle in a conventional manner. The body part 11 may be welded to the tire rim 12 which in the present instances comprises a multi-flanged drop center type tire rim which in Figure 2 is shown as a safety type of tire rim.

The tire rim 12 includes an attachment flange 13 which is adapted to be connected to the body part 11. Disposed at the outer end of the flange 13 is a generally radially outwardly extending flange 14, having disposed at its outer end a generally axially outwardly extending intermediate rim flange 15 with the rim being slightly dished at the junction of the flanges 14 and 15 to define an annular groove 16 having an annular shoulder or fulcrum shoulder structure 17 on the intermediate flange 15. Connected at the outer end of the intermediate flange 15 is a generally radially outwardly extending flange 18 which in turn terminates in a terminal rim flange 19.

Carried upon the tire rim 12 is a tire assembly 20 which lends itself to being inflated by means of inserting air through valve stem 21 (Figure 1). The tire assembly 20 may be either a pneumatic tire and tube assembly or a tubeless tire assembly.

As is shown in Figure 1, circumferentially spaced spring clips 22 are riveted at 23 to the tire rim 12 and specifically the attachment flange 13.

The clips 22 are preferably made from spring steel in order to afford ample resiliency for maintaining a wheel cover member in assembly upon the wheel.

Each of the clips 22 include an attachment clip portion 24, a generally radial clip portion 25 and a dished clip portion 26. These clip portions 24, 25 and 26 are adapted to follow the cross sectional configuration of the tire rim 12 and engage in nested bottomed engagement therewith. It should be noted that when the clip 22 is in nested bottomed engagement with the tire rim 12, that the clip portion 26 is bottomed in the groove 16 on the tire rim. The clip 22 has at its axially outer end a generally radially inwardly axially outwardly extending resiliently deflectable leg 27. The leg 27 in turn leads into a generally radially and axially inwardly extending short stiff terminal flanges 28 having at its inner end a plurality of inner edge surfaces 29. Each of these edge surfaces 29 are disposed at the free end of gripping teeth 30 cut out of the flange 28.

Adapted to be disposed in protective overlying relation upon the wheel is my ornamental wheel cover member 31 which in the present instance may be made from any suitable material such as steel, aluminum, and the like.

The cover 31 includes an enlarged crown 32 and is intermediately dished at 33. Disposed radially outwardly of the crown 32 is a generally axially outwardly extending cover portion 34 providing an annular shoulder or clip engaging cover surface which cover portion 34 is turned axially outwardly of the crown 32. The clip engaging cover surface is rounded at its axially inner end providing a cam for progressive deflection of the clip edge engaging surface 29. Connected at the outer end of the portion 33 is a generally radially outwardly extending portion 34' having at its outer end an annular rib 35 which is in turn connected to outer cover margin 37. In assembly the rib 35 is bottomed upon the tire rim 12. The cover margin 37 has an underturned annular bead 38 in close proximity to the terminal rim flange 19 which not only reinforces the cover margin but provides a pry-off surface.

To assemble the cover 31 upon the wheel the valve stem 21 is initially aligned with respect to cover opening 39. Thereafter, the cover may be pressed toward the wheel with the teeth 30 tentatively engaging the camming surface or shoulder defined by cover portion 34. In order to develop a gripping action between the clips and cover, the clips and particularly the teeth 30 are arranged in a common circle having a diameter which is normally slightly smaller than the outside diameter of the camming surface or shoulder. Upon the application of additional pressure against the cover, the leg portion 27 of the clip is biased radially outwardly upon fulcrum or shoulder 17 to retainingly engage with the cover portion 34. When the cover is in full assembly with the wheel, it will be noted the rib 35 is bottomed against the tire rim to insure against axially inward cover displacement and possible damage to the spring clips 22.

To remove the cover from the wheel a suitable pry-off tool may be inserted underneath the bead 38 and upon the application of a suitable pry-off force, the cover may be ejected from the wheel.

Illustrated in Figure 3 is a modified form of my invention wherein the wheel structure is indicated generally by the reference numeral 40. The wheel structure in this instance includes a body part 41 and a tire rim 42. The body part may be attached to the axle of an automobile in the same manner as in the first form of my invention. The tire rim 42 includes an attachment flange 43, a generally radially outwardly extending flange 44, an intermediate axial rim flange 45 and terminating in a terminal flange 46. It will be appreciated that the tire rim 42 is of a multi-flanged drop center type. At circumferentially spaced intervals on the tire rim are attached resilient spring clips 47 by means of rivets 48 with the rivets extending through the attachment flange 43 to bind the clips thereto.

Each of the clips 47 is more or less of a stepped configuration having an attachment portion 48, and a generally radially extending portion 49. Connected to the radial portion 49 is an arcuate portion 50 which is adapted to generally follow the cross sectional configuration of the annular groove at the junction of rim flanges 44 and 45. Extending generally axially outwardly radially inwardly from the portion 50 is a resilient elongated leg portion 51 which terminates in a generally radially and axially outwardly extending curled terminal 52.

A cover member 53 has been provided which is adapted for overlying concealed retained disposition upon the wheel and may be made from any suitable material such as aluminum steel and the like. The cover 53 possesses a central crown 54 having an intermediate dished portion 55. The dished portion 55 is defined at its radially outer side by an annular nose portion 56 which leads to an annular grooved portion 57 axially outwardly of the portion 56. The annular nose portion 56 and grooved portion 57 define together an annular shoulder 58 behind which gripping edges 59 of the clips 47 are adapted to be bottomed in gripping relation therewith. It will be appreciated the gripping edges are normally arranged in a common circle having a diameter slightly smaller than the shoulder 58. Also, the shoulder in both forms of the invention may be, if desired interrupted.

Connected to the dished portion 55 is the outer cover margin 60 which has an intermediate reinforcing rib 61 and terminates in a pry-off bead 62 which in assembly is adapted to bottom against the terminal rim flange 46.

To assemble the cover 53, the valve stem (not shown) is initially aligned with the corresponding cover opening (not shown). Thereafter, upon the application of an axially inward force, the clip terminals 52 are caused to flex and be cammed over the camming surface defined by annular nose portion 56 until the edges 59 are in snap-on, pry-off engagement behind annular shoulder 58. It will be appreciated, the turned terminal 52 of the clip 47 serves to stiffen the elongated resilient leg 51 and to facilitate the attainment of the desired resiliency to be imparted to the leg portion 51.

To remove the cover from the wheel, a suitable pry-off tool may be inserted underneath the bead 62 and progressively worked and turned until the cover is disengaged from the wheel.

It will be understood that modifications and variations may be effected without departing from the scope of the novel concepts of the present invention, but it is understood that this application is to be limited only by the scope of the appended claims.

I claim as my invention:

1. In a wheel structure including a wheel having junctioned tire rim and body parts and with said tire rim including an axially extending intermediate flange, circumferentially spaced spring clips on said wheel including a generally axially outwardly extending leg portion and having a generally radially facing gripping edge surface underlying the intermediate rim flange, a wheel cover member adapted for overlying protective retained disposition on the wheel and having an annular cover portion defining a radially facing shoulder underlying the intermediate rim flange, said clips and clip edge surfaces being arranged in a common circle of a slightly reduced diameter than said annular cover portion such that as the wheel cover member is pressed against the wheel said leg portions are caused to resiliently deflect and with said edge surfaces in biting, gripping snap-on, pry-off engagement with said shoulder, said tire rim having radial and axial flanges defining an outer annular rim margin, said cover member having a reinforced cover margin disposed radially outwardly of the radially facing shoulder which cover margin is bounded at a radially inner side by an annular pry-off rib and at its radially outer side by an annular terminal edge which overlies said rim margin, said cover margin having an arched portion which is arched radially outwardly between said annular pry-off rib and said annular terminal edge, said cover margin being bottomed against said rim margin to minimize axial slippage between the engaged surfaces of the clips and the cover member and with said arched portion spaced axially from the rim margin and defining a pocket.

2. In a wheel structure including a wheel having junctioned tire rim and body parts and with said tire rim including an axially extending intermediate flange, circumferentially spaced spring clips on said wheel including a generally axially outwardly extending leg portion and having a generally radially facing gripping edge surface underlying the intermediate rim flange, a wheel cover member adapted for overlying protective retained disposition on the wheel and having an annular cover portion defining a radially facing shoulder underlying the intermediate rim flange, the clips and clip edge surfaces being arranged in a common circle of a slightly reduced diameter than said annular cover portion such that as the wheel cover member is pressed against the wheel said leg portions are caused to resiliently deflect and with said edge surfaces in biting, gripping snap-on, pry-off engagement with said shoulder, said tire rim having radial and axial flanges defining an outer annular rim margin, said cover member having a reinforced cover margin disposed radially outwardly of the radially facing shoulder which cover margin is bounded at a radially inner side by an annular pry-off rib and at its radially outer side by an annular terminal edge which overlies said rim margin, said cover margin having an arched portion which is arched radially outwardly between said annular pry-off rib and said annular terminal edge, said cover margin being bottomed against said rim margin to minimize axial slippage between the engaged surfaces of the clips and the cover member and with said arched portion spaced axially from the rim margin and defining a pocket, said axially outwardly extending leg portion adjacent said edge surface being spaced radially of both said tire rim and said cover member and wtih said axially outwardly extending leg portion provided with a short stiff generally radially inwardly extending leg portion and with said edge surface comprising a series of teeth disposed at a terminal end of said short stiff leg portions.

3. The wheel structure of claim 1 further characterized by said intermediate rim flange being provided with a shoulder intermediate the axial dimension of the intermediate rim flange and wtih an intermediate clip portion disposed between opposite ends of said generally axially outwardly extending leg portion of said clip fulcrumed on said shoulder in close radial proximity to said radially facing shoulder on said cover member engaged by said clips thereby limiting the radial play of the axially outwardly extending leg portions of said clip.

4. In a wheel structure including a wheel having a multi-flanged tire rim including an intermediate axially extending rim flange provided with fulcrum rim shoulder structure, circumferentially spaced spring clips on said wheel including a generally axially outwardly extending leg portion bottomed on said fulcrum rim shoulder structure and with the axially extending leg portion having a generally radially facing gripping edge surface disposed axially outwardly of the fulcrum rim shoulder structure, the axially extending leg portion diverging away from the axially extending rim flange axially outwardly of the fulcrum rim shoulder structure permitting the radially facing gripping edge surface to freely rock radially on its fulcrum comprising the fulcrum rim shoulder structure, a wheel cover member adapted for overlying protective retained disposition on the wheel and having an annular cover portion defining a radially facing cover shoulder, said gripping edge surfaces on said clips being arranged in a common circle of a slightly reduced diameter than said radially facing cover shoulder such that as the wheel cover member is pressed against the wheel said axially outwardly extending leg portions are caused to resiliently deflect and with said gripping edge surfaces disposed outwardly of the fulcrum rim shoulder structure being in biting, gripping detachable engagement with said radially facing cover shoulder.

References Cited in the file of this patent

UNITED STATES PATENTS

| | | |
|---|---|---|
| 2,621,978 | Lyon | Dec. 16, 1952 |
| 2,707,449 | Lyon | May 3, 1955 |